(12) United States Patent
Kanno et al.

(10) Patent No.: US 6,368,217 B2
(45) Date of Patent: *Apr. 9, 2002

(54) INPUT DEVICE, DATA PROCESSING DEVICE, DATA PROCESSING METHOD, GAME DEVICE AND MEDIUM

(75) Inventors: Kenji Kanno; Kenji Tohma; Tomoya Takasugi, all of Tokyo (JP)

(73) Assignee: Kabushiki Kaisha Sega Enterprises, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/022,760

(22) Filed: Feb. 12, 1998

(30) Foreign Application Priority Data

Feb. 14, 1997 (JP) .............................. 9-030789

(51) Int. Cl.[7] .......................... A63F 13/00; A63F 9/24; G06F 17/00; G06F 19/00
(52) U.S. Cl. ................................ 463/36; 463/1; 463/7; 463/31; 463/32; 463/37; 463/38; 463/47; 345/184; 345/419; 345/433; 345/438
(58) Field of Search ............................ 463/36, 38, 37, 463/47, 1, 2, 6, 7, 23, 31, 32; 345/419, 436, 433, 437, 473, 474, 121, 126, 156, 184, 394, 502, 503; 273/109, 112, 129 R, 129 Q, 148 B, 148 R, 440, 441, 442, 453, 454, 460, 461; 434/34, 55; 472/59, 60

(56) References Cited

U.S. PATENT DOCUMENTS

| | | | | | |
|---|---|---|---|---|---|
| 3,159,400 | A | * | 12/1964 | Brass et al. ..................... | 273/1 |
| 3,408,067 | A | * | 10/1968 | Armstrong .................... | 272/16 |
| 4,629,181 | A | * | 12/1986 | Krive ........................ | 272/97 X |
| 4,817,950 | A | * | 4/1989 | Goo ....................... | 273/248 B |
| 4,906,192 | A | * | 3/1990 | Smithard et al. ........ | 434/253 X |
| 4,952,152 | A | * | 8/1990 | Briggs et al. ............. | 434/69 X |
| 5,015,189 | A | * | 5/1991 | Wenzinger, Jr. .......... | 434/63 X |
| 5,049,079 | A | * | 9/1991 | Furtado et al. ......... | 434/253 X |
| 5,423,554 | A | * | 6/1995 | Davis ..................... | 273/437 X |
| 5,547,382 | A | * | 8/1996 | Yamasaki et al. ......... | 434/61 X |
| 5,618,179 | A | * | 4/1997 | Copperman et al. ...... | 434/69 X |
| 5,713,794 | A | * | 2/1998 | Shimojima et al. ....... | 463/36 X |
| 5,816,913 | A | * | 10/1998 | Nakamura ..................... | 463/6 |
| 5,860,861 | A | * | 1/1999 | Lipps et al. .............. | 463/36 X |
| 5,947,823 | A | * | 9/1999 | Nimura .................... | 463/32 X |
| 6,001,017 | A | * | 12/1999 | Okano et al. ............. | 463/43 X |
| 6,007,423 | A | * | 12/1999 | Nakamura ................. | 463/6 X |
| 6,024,675 | A | * | 2/2000 | Kashiwaguchi ............ | 482/4 X |
| 6,106,297 | A | * | 8/2000 | Pollak et al. ............ | 434/16 X |

* cited by examiner

Primary Examiner—Jessica J. Harrison
Assistant Examiner—Binh-An D. Nguyen
(74) Attorney, Agent, or Firm—Keating & Bennett, LLP

(57) ABSTRACT

An input device includes a board whereon a player stands with both feet, and supporting mechanisms for supporting the board such that it can oscillate. The input device supplies oscillatory information when the player causes the board to oscillate with respect to the game machine. In the supporting mechanism, the central axis of oscillation is positioned on the lower portion of, or below, the board. The center of rotation of swinging movement in the supporting mechanism is positioned below the board.

21 Claims, 12 Drawing Sheets

INPUT DEVICE, DATA PROCESSING DEVICE, DATA PROCESSING METHOD, GAME DEVICE AND MEDIUM

BACKGROUND OF THE INVENTION

1. Field of the Invention

This invention relates to an input device, data processing device, data processing method and game device for conducting a simulation wherein a player moves virtually in a virtual three-dimensional space, by means of the player standing on a board, such as skis, a snowboard, skateboard, or the like, and operating this board via his or her feet. In particular, it relates to a device and method suitable for simulations wherein the player travels along a course containing a difference in height by means of the board.

2. Description of the Related Art

A game device generally comprises a game machine equipped with an internal computer for executing predetermined game programs, an operating device for supplying the computer with operating signals indicating the movement of characters (objects) represented in the game, a display for displaying images representing the development of the game as the computer execute the game program, and a sound device for generating sounds accompanying this development of the game.

On area of such game devices which is known in the prior art relates to game devices for playing skiing games, or the like, wherein the player stands on boards which represent skis, or the like. Examples thereof include the "game devices" disclosed in Japanese Unexamined Patent Publication No. 8-280936, and the "simulator operation input device" disclosed in Japanese Unexamined Patent Publication No. 9-742.

Of these, the game device disclosed in the former patent is a game device which is used for skiing, snowboarding or skateboarding games, and essentially, it comprises input means for inputting turning operations simulating the turning actions of the player standing on the board, calculating means for calculating the state of travel of the player's character in a virtual game space on the basis of these turning operations and a prescribed program, and a display for displaying game images according to this state of travel, wherein the calculating means comprises means for judging whether or not a turning operation is a skating action, and means for accelerating the player's character on the basis of this judgement result and the aforementioned state of travel. Furthermore, this conventional device also allows the player to select the course. The selected course is a single winding route containing a height difference, and the player starts from a departure position and ends at a finish position.

Futhermore, the "simulator operation input device" disclosed in the latter patent is an operation input device for a movement simulator whereby the direction of virtual travel is controlled in a leftward or rightward direction by causing an oscillating platform to oscillate leftwards or rightwards in conjunction with a virtual travelling image of a virtual travelling object. The oscillating platform is caused to return to its central position by means of first and second elastic means, and the device is capable of absorbing impacts applied when the movement of the oscillating platform is restricted. The oscillating platform can be made to swing (oscillate) to left and right by means of a player standing on the platform with both feet and moving his or her body weight. The centre of rotation of this swinging movement is set at a prescribed position front of, and apart from, the oscillating platform.

With the progress of image processing technology in recent years, it has been sought to provide ever clearer and more realistic images in game devices, whether they are for domestic or commercial use, and game contents of increasing richness and variety have been demanded. This situation applies equally to skiing or skateboarding games, etc. provided by the conventional devices described above. Specifically, from the aforementioned viewpoint, the games played on conventional devices diminish the player's interest for the following reasons.

First, there is the problem with conventional devices, that the swinging sensation lacks realism. In a swinging action using a real skateboard or skis, in many cases, the rotation (swing) is centered about the person's foot position. In other words, leaving aside jumps to the left or right, since the swinging action is caused by movement of the person's body weight, in many cases, the center of rotation of this action occurs at the person's feet (the boot region which transfers the movement of body weight). In contrast, in a conventional device, the swinging action to the left and right which determines the direction of travel is conducted about an axis of rotation positioned in front of the swinging platform (board). The swinging action therefore includes a large amount of circumferential movement component, and consequently, this swinging action feels strange and lacks realism compared to using real skis or a real skateboard.

Secondly, in a conventional device, the course used when the game player is moving through a virtual three-dimensional space involves the player simply moving (by skiing, for example,) from a start position to a finish position. However, if the player wishes to continue the game once he or she has reached the finish, then there is no alternative but to play the game again from the start. Therefore, the game lacks continuity, and if someone plays the game as many times as they want for a long period of time, then the player will often lose interest in the game and find, for instance, that the game operation becomes laborious and complicated. However, if a single course is made sufficiently long, problems such as requirement of a large amount of data and increased memory capacity will arise.

The present invention was devised in view of the aforementioned situation relating to the prior art, a first object thereof being to make the swing of a board in a game which is played by a person standing on a board, such as skis, a skateboard, or the like, as close as possible to the state of a swinging action in real life, thereby improving realism and increasing the attraction of the game.

It is a second object of the present invention to enable a game to be played, wherein the player travels along a course continuously for a long period of time, without the game operation becoming complicated, or the like.

It is a third object of the present invention to make the swing of a board in a game which is played by a person standing on a board, such as skis, a skateboard, or the like, as close as possible to the state of a swinging action in real life, thereby improving realism and increasing the attraction of the game, whilst at the same time enabling a game to be played wherein the player travels along a course continuously for a long period of time, without the game operation becoming complicated, or the like.

SUMMARY OF THE INVENTION

In order to achieve the aforementioned objects, the input device relating to the present invention comprises a platform on which a player stands with both feet, and a supporting mechanism which supports this platform such that it can oscillate freely, and the input device supplies oscillatory information resulting from the player causing the platform to oscillate to a game machine, and in the supporting mechanism, the central axis of the oscillatory movement is positioned on the lower portion of, or below, the platform.

For example, the supporting mechanism is composed such that it supports the platform swingably in a horizontal plane at the least, and the central axis of the oscillatory movement is the central axis of rotation of the swing, and the oscillatory information is swing information. In this case, preferably, the game machine is provided with means for simulating a state where a character representing the player moves through a virtual three-dimensional space based on the swing information.

Futhermore, for example, the oscillation may comprise swing in the horizontal plane of the platform, roll in the lateral direction of the platform, and pitch in the longitudinal direction of the platform, and the supporting mechanism may comprise a swing mechanism which supports the platform such that it can swing, a roll mechanism which supports the platform such that it can roll, and a pitch mechanism which supports the platform such that it can pitch. In this case, a structure is used wherein the swing mechanism supports the roll mechanism from below, this roll mechanism supports the pitch mechanism from below, and this pitch mechanism supports the platform. The swing mechanism, the roll mechanism and the pitch mechanism may also be provided, respectively, with force applying means which apply force to the platform to return it to predetermined central positions in the swing, roll or pitch movements.

The platform may be a board for a skateboarding game, for example.

Futhermore, in an input device for supplying operational information to a game machine simulating a state where a player moves through a virtual three-dimensional space, the input device relating to the present invention comprises a platform on which the player stands with both feet, a supporting mechanism for supporting this platform such that it can oscillate, and sensors for detecting pitch information, when the platform is pitched in a forward or backward direction by means of the player moving his or her body weight on the platform, and supplying this information to the game machine. It may also comprise sensors for detecting and supplying to the game machine oscillation angle information relating at least one oscillatory movement from: oscillation causing the platform to roll in a lateral direction, and/or oscillation causing the platform to swing in its horizontal plane, induced by the player moving his or her body weight on the platform.

Moreover, in a data processing device for processing data for a simulation, wherein a character moves along a course set in a virtual three-dimensional space leading from a high departure point to a low arrival point, the data processing device relating to the present invention comprises: judging means for judging whether or not the character has reached the arrival point; and co-ordinate substituting means for substituting the co-ordinates for the character in the virtual three-dimensional space with the positional co-ordinates of the departure point, when the judging means judges that the character has reached the arrival point.

Desirably, the course comprises a winding (meandering) or spiral section in at least a portion thereof. Furthermore, desirably, movement control means are provided for controlling the movement of the character by considering the acceleration due to gravity depending on the gradient of the course, and the operational information from the player relating to the movement of the character.

In a data processing method for processing data for a simulation, wherein a character moves along a course set in a virtual three-dimensional space leading from a high departure point to a low arrival point, the data processing method relating to the present invention comprises the steps of: judging whether or not the character has reached the arrival point; and substituting the co-ordinates for the character in the virtual three-dimensional space with the co-ordinates of the departure point, when the judging means judges that the character has reached the arrival point.

The medium according to the present invention stores the program which have a computer execute the data processing method.

A medium includes, for example, a flexible disk, hard disk, magnetic tape, photomagnetic disk, CD-ROM, DVD, ROM cartridge, RAM memory cartridge with battery back-up, flash memory cartridge, fixed RAM cartridge, etc. Further, it includes telecommunication mediums such telephone circuits, etc., which are wire communication mediums, and microwave circuits, etc., which are radio communication mediums. The internet is also included in the telecommunication medium stated herein. A medium has information (mainly digital data or programs) stored therein by some physical means, and is capable of implementing the prescribed functions in a processing device such as a computer, exclusive processor, etc. That is, any means which downloads the program onto a computer and executes the prescribed functions is fine.

Moreover, a game device relating to the present invention, comprises a game machine for conducting a simulation wherein a character representing a player moves through a virtual three-dimensional space, and an input device for supplying operational information required by this game machine for calculating the movement of the character. The input device comprises: a platform on which the player stands with both feet; a supporting mechanism for supporting this platform such that it can oscillate; and pitch movement sensors for detecting pitch movement information when the player causes the platform to pitch by moving his or her body weight on the platform. The game machine comprises movement control means for controlling the movement of the character in the virtual three-dimensional space on the basis of the pitch movement information detected by the pitch sensors.

The input device may, for example, be provided with at least one of: a swing movement sensor for detecting swing movement information when the player causes the platform to swing by moving his or her body weight on the platform; and a roll movement sensor for detecting roll movement information when the player causes the platform to roll by moving his or her body weight on the platform. The game machine may be provided with further movement control means for controlling the movement of the character in the virtual three-dimensional space on the basis of movement information detected by at least one of the swing movement sensor and the roll movement sensor. In this case, in the supporting mechanism, the central axis of the oscillatory movement is desirably positioned on the lower portion of, or below, the platform. Furthermore, the supporting mechanism may comprise a swing mechanism for supporting the platform swingably in a horizontal plane, and this swing mechanism may be composed such that the central axis of rotation of the swing is positioned below the platform. In an even more desirable mode, the platform is a board for a skateboarding game.

DETAILED DESCRIPTION OF THE PREFERRED EMBODIMENT

Figure 1:
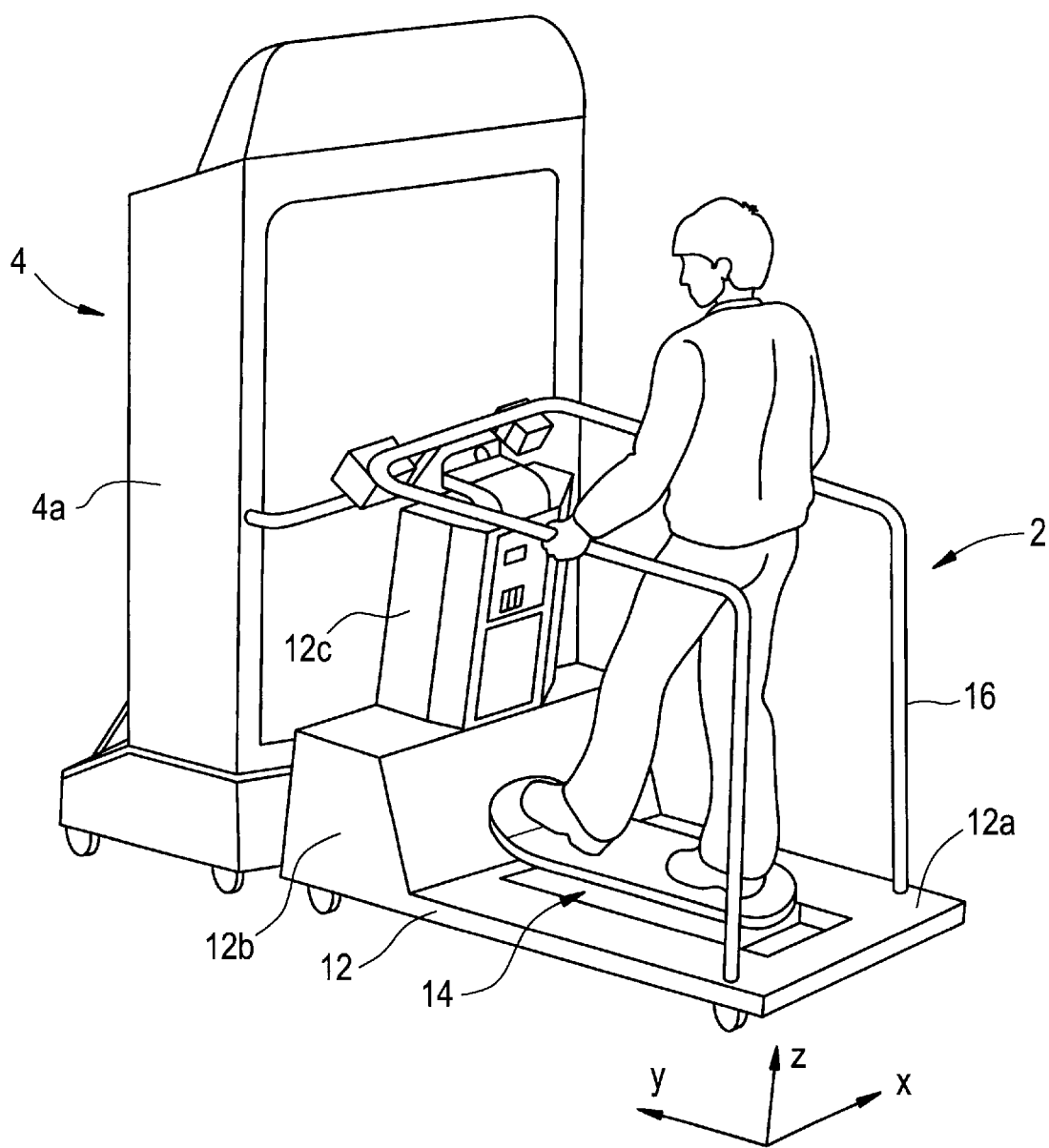
FIG. 1 is an external perspective view of a game device relating to a mode of implementing the present invention.

Below, a mode for implementing the present invention is described with reference to the drawings.

This game device provides a skateboarding game. Specifically, in the game device, a character representing the player is moved along a virtual course containing a height difference composed in a three-dimensional space, with reference to operational inputs from the player (operational inputs from the player's feet).

Although not shown in the drawing, it is also possible to provide a plurality of game devices which are constructed such that they are mutually connectable, such that a plurality of players can compete with each other on a course composed in a three-dimesional virtual space, or if a player is playing alone, he or she can compete with a rival according to a program previously devised by the machine. Furthermore, although the game device in this mode of implementation relates to a skateboarding game, besides this, the present invention may also be implemented in game devices for playing skiing, snowboarding games, or the like, where the player stands on a board-shaped oscillating platform.

Figure 2:
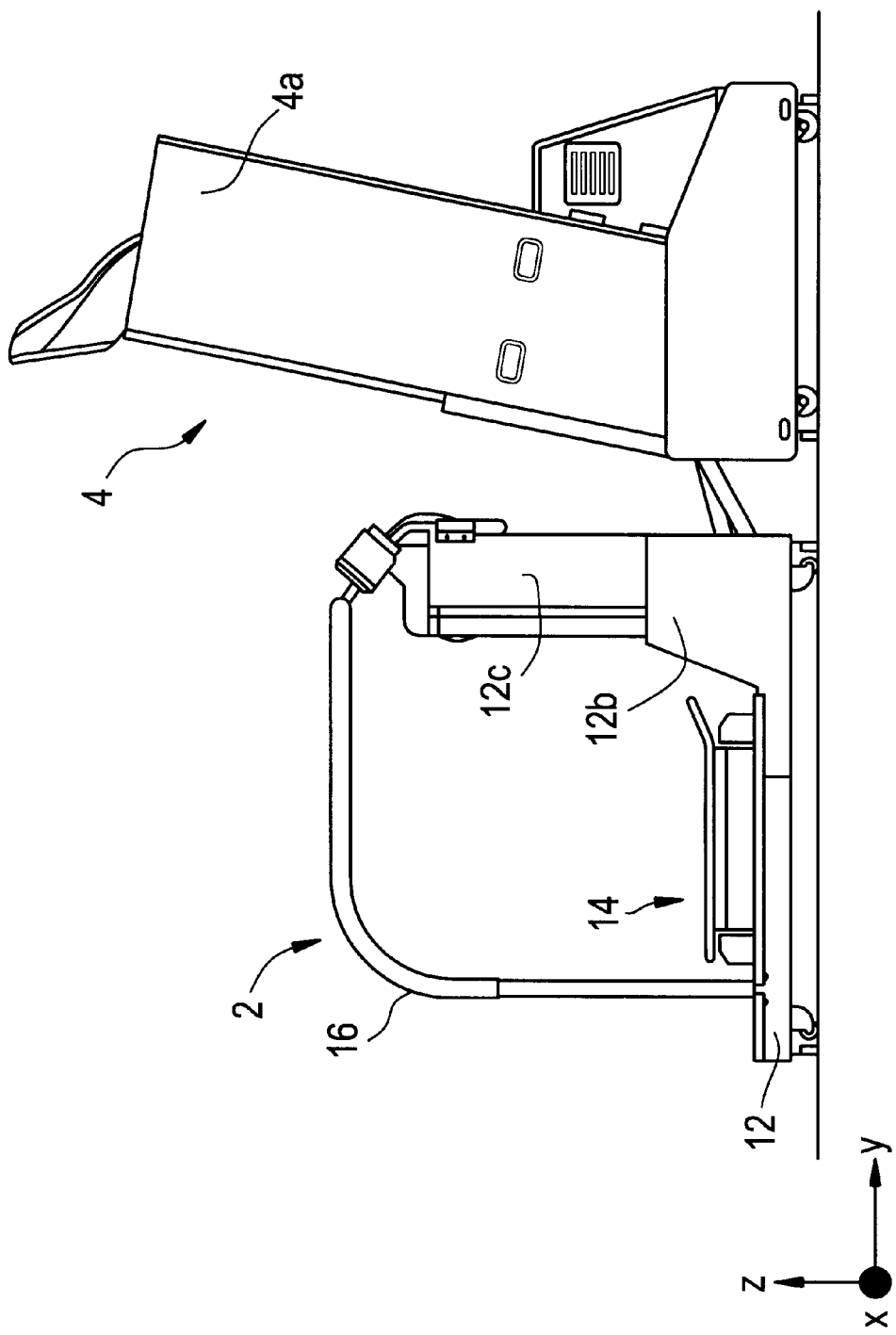
FIG. 2 is a right side view of a game device.

FIG. 1 is an external perspective view of a game device relating to the mode of implementation; and FIG. 2 is a right side view of this game device.

This game device comprises an input device 2 for inputting operations provided with a casing section on which the player stands, and a game machine 4 connected to this input device 2 for implementing prescribed game programs. For the convenience of explanation, an orthogonal co-ordinates system is introduced, and the longitudinal direction of the device corresponding to the front/back direction of the player in the game is taken as axis Y, the left/right direction is taken as axis X, and the height direction is taken as axis Z (for moving parts, a co-ordinates system is introduced based on their central position).

The input device 2 is provided with a base 12 which forms an approximately rectangular-shaped casing when viewed from above. The base 12 comprises a flat section 12a extending from the centre portion to the rear edge thereof, and a board section 14 on which the player stands is provided in a partially buried state at approximately the center of the flat section 12a. The base 12 also comprises a case section 12b formed into a square-shaped projection at the front portion thereof, and various functions are housed inside this case section 12b. A square-shaped box 12c is formed integrally on top of the case section 12b. On the side of this box 12c facing the player are provided a coin inlet for starting the game, a switch or selecting game contents, a stop switch, a view change switch, and the like. The various electrical elements housed in the box 12c are connected via the case section 12b to the game machine 4.

Also provided on the base 12 are handrails 16 which are held by the player. The handrails 16 rise upwards from either side of the rear edge of the flat section 12a and then are formed into a U-shape at a prescribed height over the base 12, whilst also supported by the box 12c. Therefore, the player can enter inbetween the handrails 16 from the rear side of the input device 2 and climb onto the board section 14, which is described later, and furthermore, the player can hold onto the handrails 16 whilst playing the game.

The game machine 4 is fixed in position in front of the input device 2, and it is covered by a casing 4a formed into an approximate box shape standing on its end. The casing 4a is connected to the case section 12b of the input device 2. A processing device, TV monitor, speaker, and various indicator lamps are provided in the game machine 4. The processing device conducts a simulation reflecting the operational inputs from the player, and displays images (player's character, background, etc.) on the TV monitor almost in real time. Therefore, the player is able to experience the action of moving along a virtual course. The player proceeds to control the game via his or her feet, by shifting body weight, or the like, whilst watching the screen.

Figure 3:
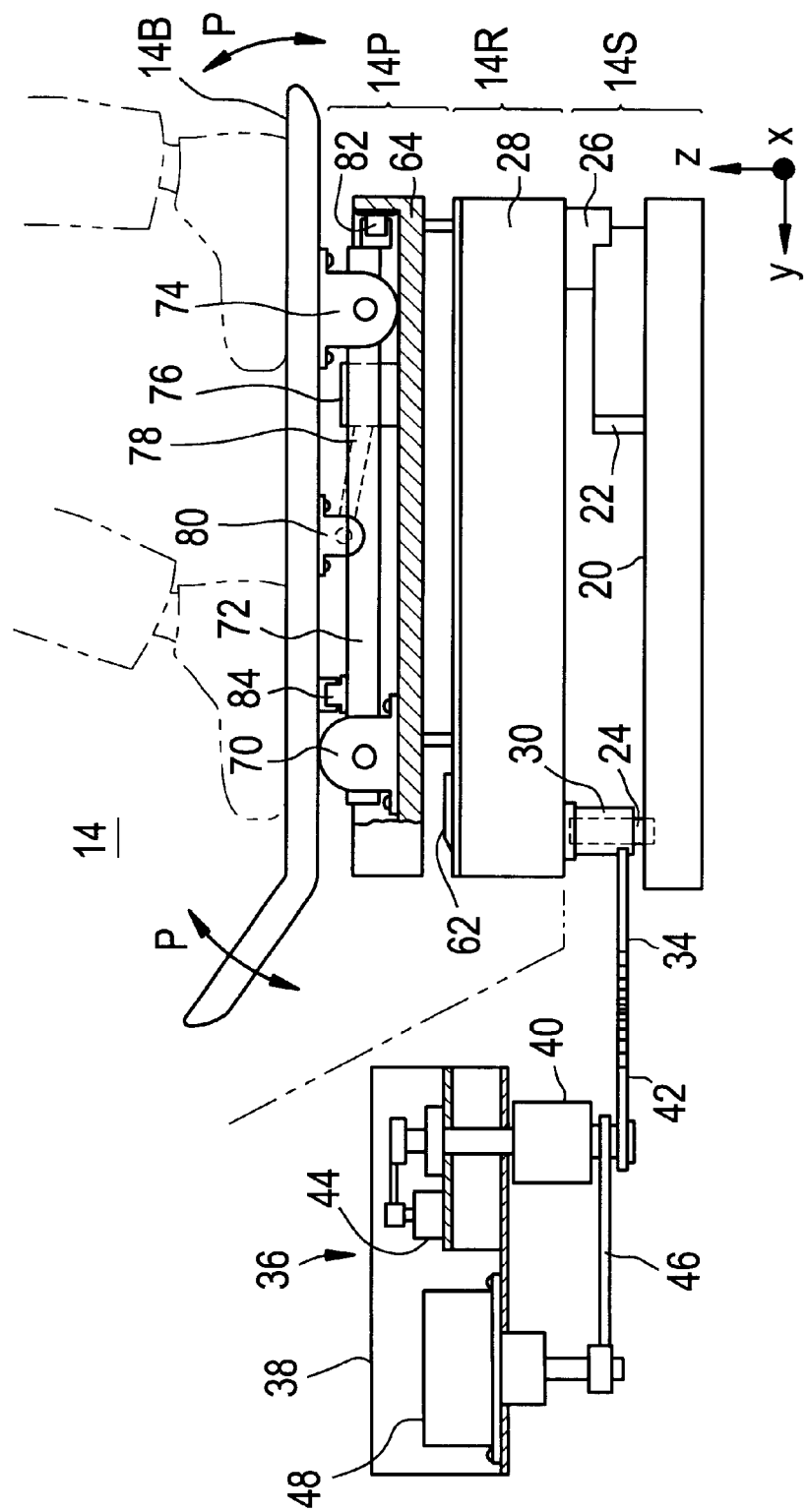
FIG. 3 is a partially cut-away side view of the board section.
Figure 4:
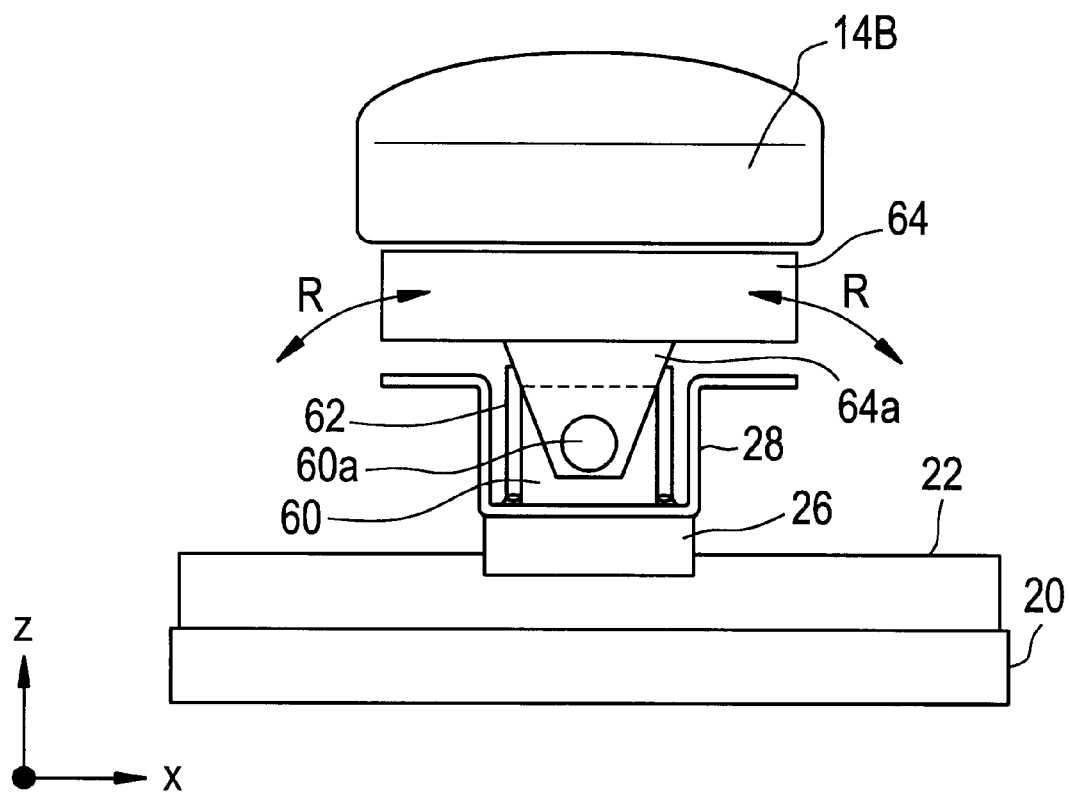
FIG. 4 is a rear view of the board section.

The board section 14 is now described on the basis of FIG. 3 and FIG. 4. FIG. 3 shows a side view of the board section 14 viewed from the direction of the X axis and partially cut away in the direction of the Y axis. FIG. 4 shows a rear view of the board section 14 in the direction of the Y axis. The board section 14 is constructed such that it can perform three oscillatory movements. These three oscillatory movements are: swing (rotation in the X-Y plane (horizontal plane) centered about a certain axis in the direction of the Z axis); roll (rotation about a certain axis in the direction of the Y axis); and pitch (forward and backward oscillation in the Y-Z plane).

Specifically, the board section 14 comprises a swing mechanism 14S capable of a swinging action in response to shifting of the player's body weight, a roll section 14R capable of a rolling action, a pitch section 14P capable of a pitching action, and a board 14B on which the player stands directly with both feet. As shown in the diagram, a structure is adopted wherein the swing mechanism 14S, roll mechanism 14R, pitch mechanism 14P, and board 14B are mutually linked mechanically, and are superimposed on each other in this order.

Figure 5:
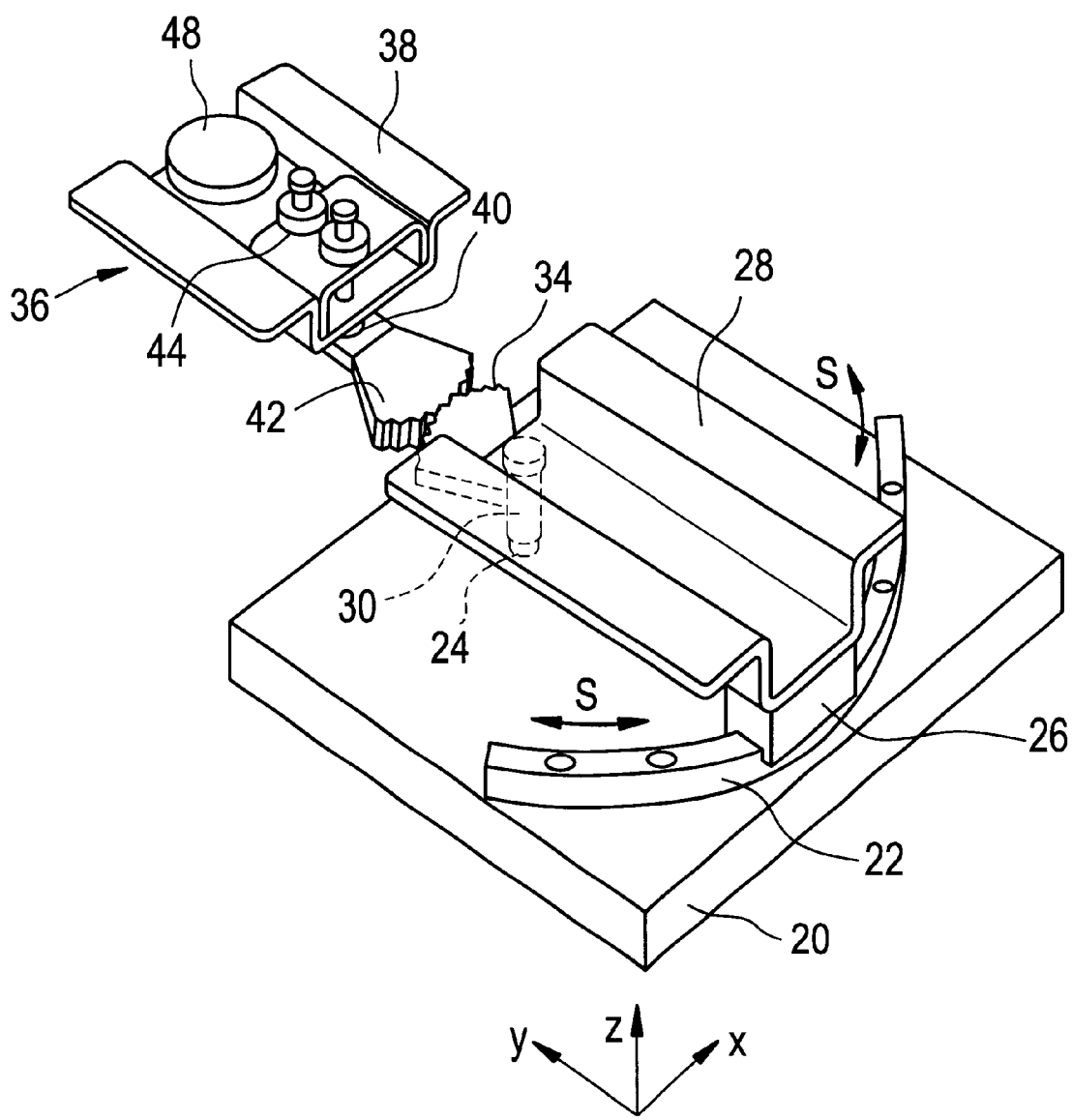
FIG. 5 is an approximate perspective view of a scan mechanism in the board section.

The swing mechanism 14S is now described with reference to FIG. 5. The swing mechanism 14S comprises a square-shaped plate 20 fixed to a fixing section on the inner portion of the base 12 (shown in FIG. 2). Components for allowing swinging movement are provided on this plate. An arc-shaped R guide 22 is fixed to one end of the plate 20 in the Y axis direction, on the upper face thereof, and a fixed axle 24 is installed in a prescribed position at the opposite end. The R guide 22 serves to guide a sliding member 26, which engages slidably with the upper face of the R guide 22, along an arc-shaped path. The interval between the sliding member 26 and the fixed axle 24 is bridged by a rail 28 formed in a gutter shape, which is rectangular in shaped as a whole when viewed from above and has side portions. Specifically, the under side of one end portion of the rail 28 is fixed to the sliding member 26, and a rotating axle 30 is fixed in a prescribed position to the under side of the other end portion, and this rotating axle 30 engages rotatably with the fixed axle 24. Therefore, the rail 28 is able to swing through a prescribed arc range determined by the R guide 22 about the axle on the plate 20 (fixed axle 24 and rotating axle 30), as indicated by the arrows S, S. Specifically, the under side of one end portion of the rail 28 is fixed to the sliding member 26, and a rotating axle 30 is fixed in a prescribed position to the under side of the other end portion, and this rotating axle 30 engages rotatably with the fixed axle 24. Therefore, the rail 28 is able to swing through a prescribed arc range determined by the R guide 22 about the axle on the plate 20 (fixed axle 24 and rotating axle 30), as indicated by the arrows S, S.

Futhermore, a first gear 34 which is fan-shaped and comprises a gear formed at the arc-shaped end thereof, projects horizontally from the rotating axle 30 in the X-Y plane. Specifically, when the rail 28 rotates, the first gear 34 rotates in the opposite direction through an angle which corresponds to the amount of rotation of the rail 28.

A sub-mechanism 36 for detecting the rotation of the first gear 34 and also for applying force is provided in front of the rail 28 in the Y axis direction. This sub-mechanism 36 forms a portion of the swing mechanism 14S, and is housed inside the box 12c.

Figure 6:
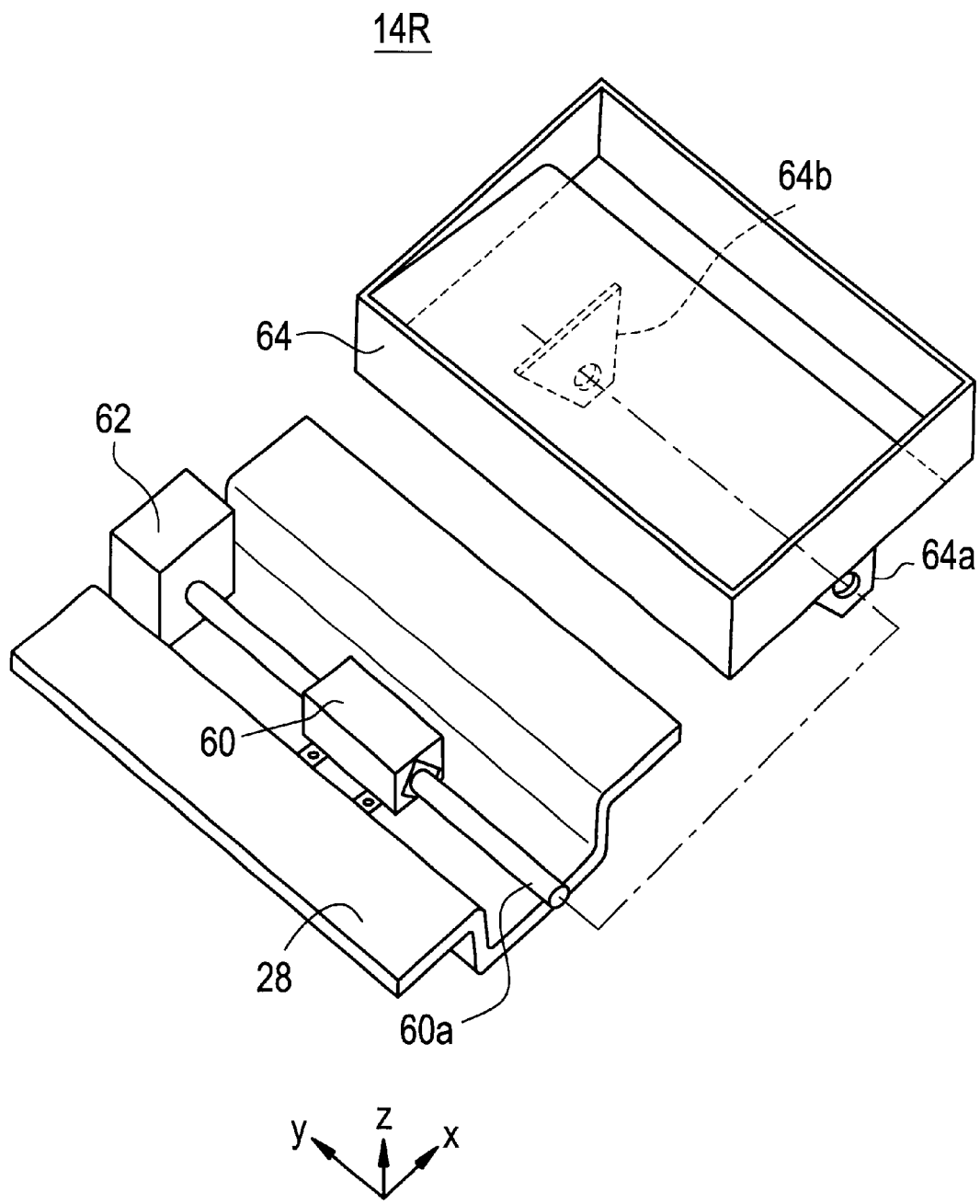
FIG. 6 is an approximate perspective view of a roll mechanism in the board section.

As shown in FIG. 3 and FIG. 6, the sub-mechanism 36 comprises a gutter-shaped sub-rail 38, centering means 40 comprising elastic material for shock absorbing whose axle is supported rotatably by the sub-rail 38, a fan-shaped second gear 42 connected to the lower axle of the centering means 40 and connected to the first gear 34, a volume (variable resistor) 44 for detecting the rotation of the upper axle of the centering means 40, a stopping member 46 which projects from the lower side of the axle of the centering means 40, and an electromagnetic brake 48 which engages freely this stopping member 46.

In order to restrict the rotation of the second gear, the centering means 40 applies rotational force to the second gear 42 such that it always reverts to its central position in a neutral state. This reverting force is transferred to the rail 28 via the first gear 34, and therefore the rail 28 also receives a force causing it to return to its central position, which is a neutral position. The volume 44 detects rotation of the centering means 40, in other words, rotation of the first gear 34 (rotation of the rail 28), and it supplies this detection signal to a processing device of the game machine, which is described later. The electromagnetic brake 48 is connected electrically via lead wires (omitted from drawing) to the volume 44, and it receives detection signals therefrom. when the volume 44 detects a neutral position, the second gear 42, and therefore the first gear 34 (rail 28), is prevented from rotating by means of the stopping member 46. In other words, when the electromagnetic brake 48 is in an operational (braking) state, the rail 28 is compulsorily prevented from swinging.

The roll section 14R is now described with reference to FIG. 6. The roll mechanism 14R uses a portion of the components of the swing mechanism 14S described above, and it is installed on the upper side of the swing mechanism 14S. Centering means 60 comprising elastic material for restricting the rotation is installed in a longitudinal direction in the groove portion of the aforementioned rail 28, and a volume 62 for detecting the angle of rotation of the axle 60a of this centering means is provide at one end of this axle. The axle 60a of this centering means 60 is fixed to a board supporting case 64 having an upward-facing opening. Specifically, approximately triangular-shaped bosses 64a, 64b project from the under side of the case 64, and the axle 60a passes through these bosses 64a, 64b and is fixed thereto. The height of the bosses 60a in the Z axis direction is set to a prescribed value.

Therefore, the board supporting case 64 as a whole can be rolled through a prescribed angle as indicated by the arrows R, R in FIG. 4, by means of the player moving his or her body weight against the force applied by the centering means 60. This roll angle is detected by the volume 62 and the detection signal is transmitted to the processing device of the game machine 4. Since the player causes the board to roll against the force applied by the centering means 60, he or she always receives a force in the opposite direction, even when rotating in the direction of the roll. Therefore, when the roll ends, the whole board supporting case 64 returns automatically to the flat neutral position.

The pitch mechanism 14P and the board 14B are now described with reference to FIGS. 3, 4 and 7. As shown in FIG. 3, the pitch mechanism 14P makes use of a portion of the components in the roll mechanism 14R described above, and it is installed on the upper side of the roll mechanism 14R. A plate-shaped inner frame 72 is installed inside the aforementioned board supporting case 64 by means of bearings 70, 70 provided on either side of the front end of the case. This inner frame 72 is formed to have a smaller surface area than the board supporting case 64, and it can rotate freely about the bearings 70, 70. Further bearings 74, 74 are provided on either side of the rear end of the inner frame 72, and the board 14B is attached by means of these bearings 74, 74. The board 14B is formed such that it is broader than the board supporting case 72 in both the front/back and left/right directions, and it has a prescribed thickness. Therefore, the bearings 74, 74 are installed on either side of the base of the board 14B towards the rear thereof. By this means, the board 14B is rotatable with respect to the inner frame 72 about the bearings 74, 74, in other words, about the rear portion of the board 14.

Futhermore, centering means 76 comprising elastic material for shock absorbing is installed in a right-sided position on the board supporting case 64 (viewed from the Y axis direction). This centering means 76 is connected to a bearing 80 via an arm 78, and this bearing 80 is fixed to the base of the board 14B. Thereby, when the board 14B is caused to pitch, such that the front of the board 14B rises up and the rear of the board descends, the force applied by the centering means 76 acts to pull the board 14B towards the inner frame 72. (Since the board 14B floats slightly above the board supporting case 64 in the initial state where it is flat in the X-Y plane, due to the way in which the axle height of the bearings 70, 70 and the height of bearings 74, 74 are set, the board receives a slight reverting force from the centering means 76 even in this state.)

Two photointerrupters 82, 84 for detecting a pitching action by means of on and off signals are provided on the pitch mechanism 14P. The first photointerrupter 82 detects the state of inclination between the board supporting case 64 and the inner frame 72 at the rear side of the pitch mechanism 14P. The second photointerrupter 84 detects the state of inclination between the inner frame 72 and the board 14B in a forward position of the pitch mechanism 14P.

Figure 7A:
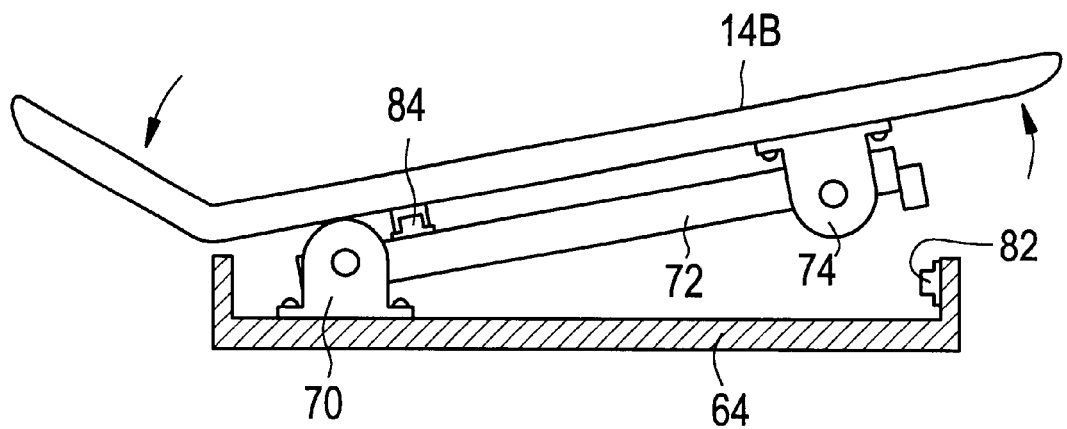
FIG. 7 shows diagrams illustrating a pitching action of a pitch mechanism in the board section.
Figure 7B:
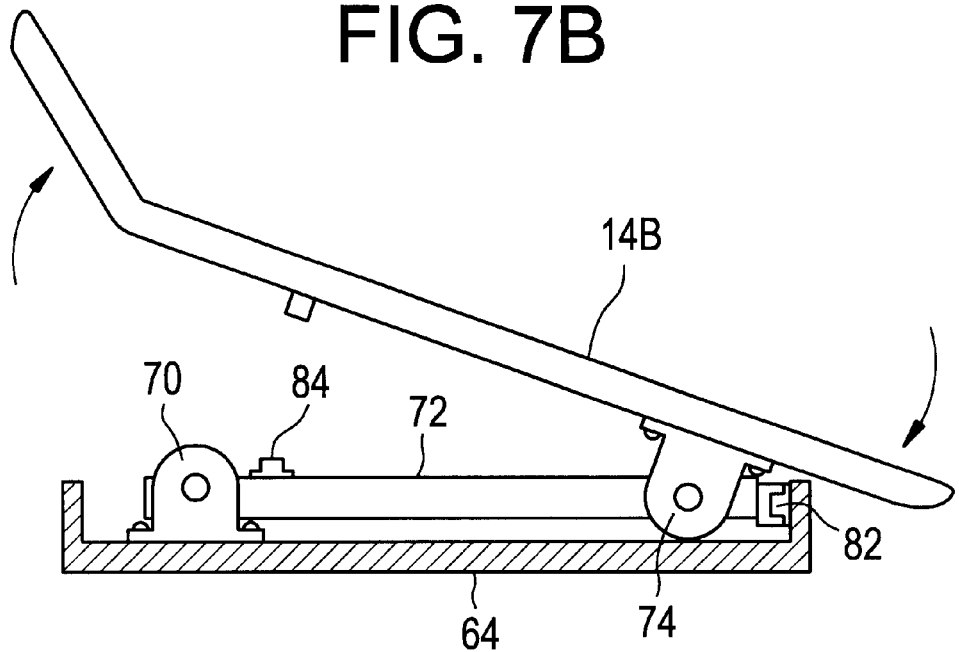

The board 14B can be pitched in a forward direction by means of the player shifting his or her body weight forward, against the force applied by the centering means 76. For example, the board 14B can be pitched to a state where its rear end is raised in the air by means of the player shifting his or her body weight forward of the fulcrum formed by the front bearings 70, 70. An example of this state is shown in FIG. 7(a) (in the embodiment shown in FIG. 7(a), the front photointerrupter 84 is off and the rear photointerrupter 82 is on). Conversely, the board 14B can be pitched to a state where its front end is raised in the air by means of the player shifting his or her body weight behind the fulcrum formed by the rear bearings 74, 74. An example of this state is shown in FIG. 7(b) (in the embodiment shown in FIG. 7(b), the front photointerrupter 84 is on and the rear photointerrupter 82 is off). If the player does not shift his or her body weight, then the board 14B lies in its horizontal initial position in the X-Y plane, as illustrated in FIG. 3, in which case both the front and rear photointerrupters 84 and 82 are in an off state. The on and off state of the photointerrupters 84 and 82 is supplied to the processing device of the game machine 4 as on and off operating information representing pitching actions (movement) performed by the player.

Figure 8A:
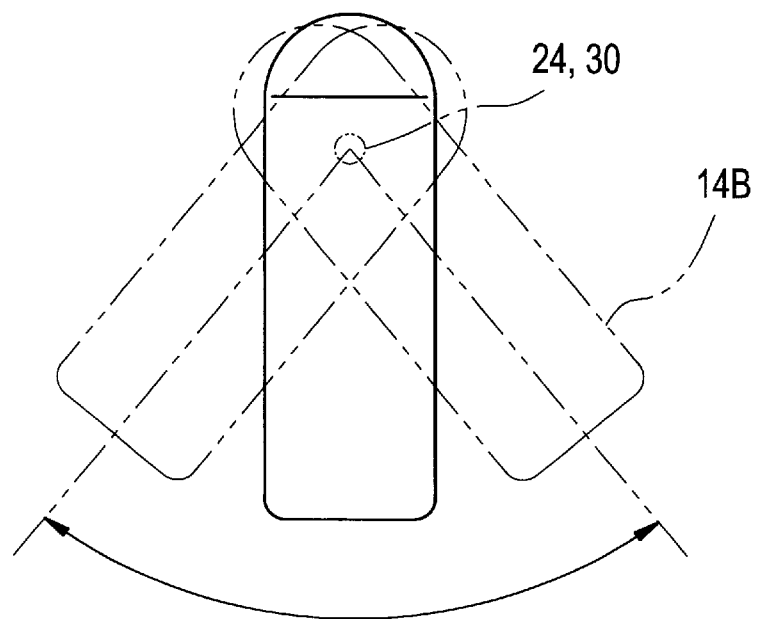
FIG. 8 shows diagrams illustrating the approximate action of a scan mechanism and a roll mechanism in the board section.
Figure 8B:
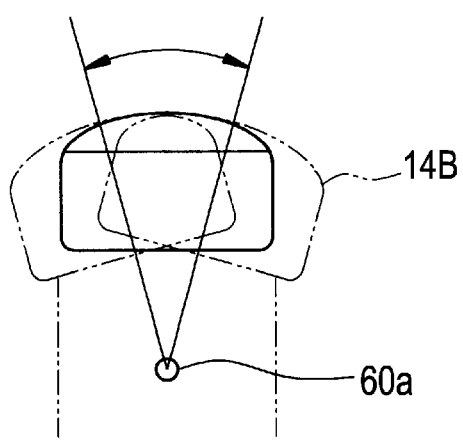

In this way, by means of the board section 14 according to the present mode of implementation, it is possible to swing the board 14B through a prescribed range about axes of rotation 24 and 30 (see FIG. 8(a)). It is also possible to roll the board 14B through a prescribed range about axis of rotation 60a (see FIG. 8(b)), and it is possible to pitch the board 14B through a prescribed range about axis of rotation 70 or 74 (see FIGS. 7(a) and (b). Here, all the axes of rotation are located on the under side of, or below, the board 14B, and therefore an operational feel approximating that obtained when using a real skateboard can be achieved.

Figure 9:
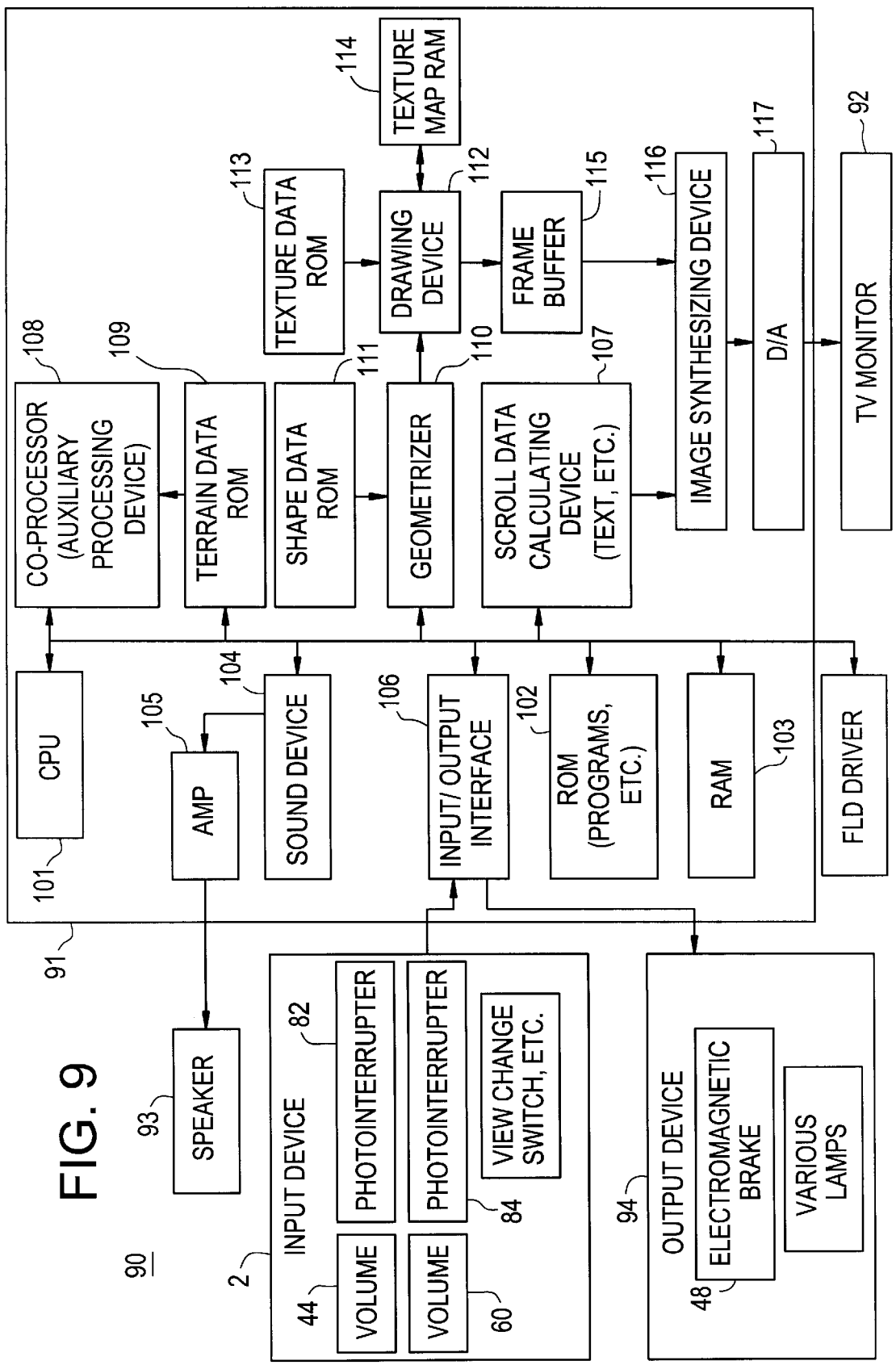
FIG. 9 is a partially functionalized approximate block diagram of a data processing section of a game machine.

Next, a data processing section 90 incorporated in the game machine 4 which is the principal element in controlling and data processing will be described with reference to FIG. 9.

This data processing section 90 comprises a processing device 91, TV monitor 92, and a speaker 93. The processing device 91 is connected to the electrical system components of the input device 2 described above, and it is also connected to an output device 94 comprising the electromagnetic brake 48 and various indicator lamps. The TV monitor 92 displays images of the skateboarding game, and a projector may also be used instead of this TV monitor 92.

The processing device 91 (shown in FIG. 9) comprises a CPU (central processing unit) 101, as well as a ROM 102, RAM 103, sound device 104, input/output interface 106, scroll data computing device 107, co-processor (initial processing device) 108, terrain data ROM 109, geometrizer 110, shape data ROM 111, drawing device 112, texture data ROM 113, texture map RAM 114, frame buffer 115, image synthesising device 116, and D/A convertor 117.

Here, polygons are used to display images. 'Polygon data' refers to a data group of relative or absolute co-ordinates for the vertices of polygons formed by sets of plural vertices. The terrain data ROM 109 stores polygon data which is set in relatively broad terms and is sufficient for determining the contact between the character representing the player standing on the board and the ground surface. The shape data ROM 111, on the other hand, contains polygon data which is set precisely and relates to the shapes constituting images, such as the character, ground surface, background and the like.

The CPU 101 is connected via a bus line to the ROM 102 which stores prescribed programs, and the like, the RAM 103, which stores data, the sound device 104, input/output interface 106, scroll data calculating device 107, co-processor 108, and the geometrizer 110. The RAM 103 functions as a buffer, and is used in the processes of writing commands to the geometrizer 110 (to display an object, for example,) and writing matrices in conversion matrix calculation (scaling, etc.).

The input/output interface 106 is connected to the input device 2 and the output device 94, whereby operating signals from the input device 2 (signals from the volume and photointerrupters) can be read into the CPU 101 in the form of digital values, and control signals generated by the CPU 101, and the like, can be output to the electromagnetic brake 48. The sound device 104 is connected to the speaker 14 via a power amplifier 105, and sound signals generated by the sound device 104 are amplified and then supplied to the speaker 93.

The CPU 101 reads in operating signals from the input device 2 and terrain data from the terrain data ROM 109 and/or shape data from the shape data ROM 111 (three-dimensional data, such as "object, e.g. player's character", "background, e.g. sky, tree, rock, etc."), and conducts behaviour processing relating to the character, background processing, and contact judgement and processing.

Character behaviour processing simulates the movements of a character in a three-dimensional space in accordance with the player's operating signals received via the input device 2. After co-ordinates in the three-dimensional virtual space have been determined, a conversion matrix for converting these co-ordinates to a field of view co-ordinates system, and shape data (for characters, terrain, etc.) are supplied to the geometrizer 110. The co-processor 108 is connected to a terrain data ROM 109, and previously determined terrain data is transferred to the co-processor 108 and the CPU 101. The co-processor 108 principally implements the process of judging the contact between the character and the ground surface, and this judgement processing and the calculation of the character's behaviour are chiefly performed by floating-point operations. As a result, the co-processor 108 judges the contact between the character and the ground surface and supplies these judgement results to the CPU 101. This reduces the calculating load on the CPU 101 and allows this contact judgement processing to be carried out at high speed.

The geometrizer 110 is connected to the shape data ROM 111 and the drawing device 112. Shape data (three-dimensional data for the character, ground surface, background, etc., comprising all vertices thereof) is previously recorded in the shape data ROM 111, and this shape data is supplied to the geometrizer 110. The geometrizer 110 performs a transparent conversion of the specified shape data using the conversion matrix supplied by the CPU 101, thereby yielding data converted from the co-ordinates system of the three-dimensional virtual space to a field of view co-ordinates system.

The drawing device 112 applies texture to the shape data that has been converted to the field of view co-ordinates system, and outputs this data to the frame buffer 115. In order to apply texture, the drawing device 112 is connected to the texture data ROM 113 and the texture map RAM 114, and also to the frame buffer 115.

The scroll data calculating device 107 calculates data for scrolling screens, such as text, and this calculating device 107 and the frame buffer 115 are fed via an image synthesising device 116 and a D/A converter 117 to the TV monitor 92. By this calulating means, polygon images for the character, ground surface, background, and the like, recorded temporarily in the frame buffer 115 are synthesised according to a specified priority with scrolling screens of text information, such as speed, lap time, etc., to create the final frame image data. This image data is converted to an analogue signal by the D/A converter 117 and supplied to the TV monitor 92, which displays game images in real time.

Figure 10:
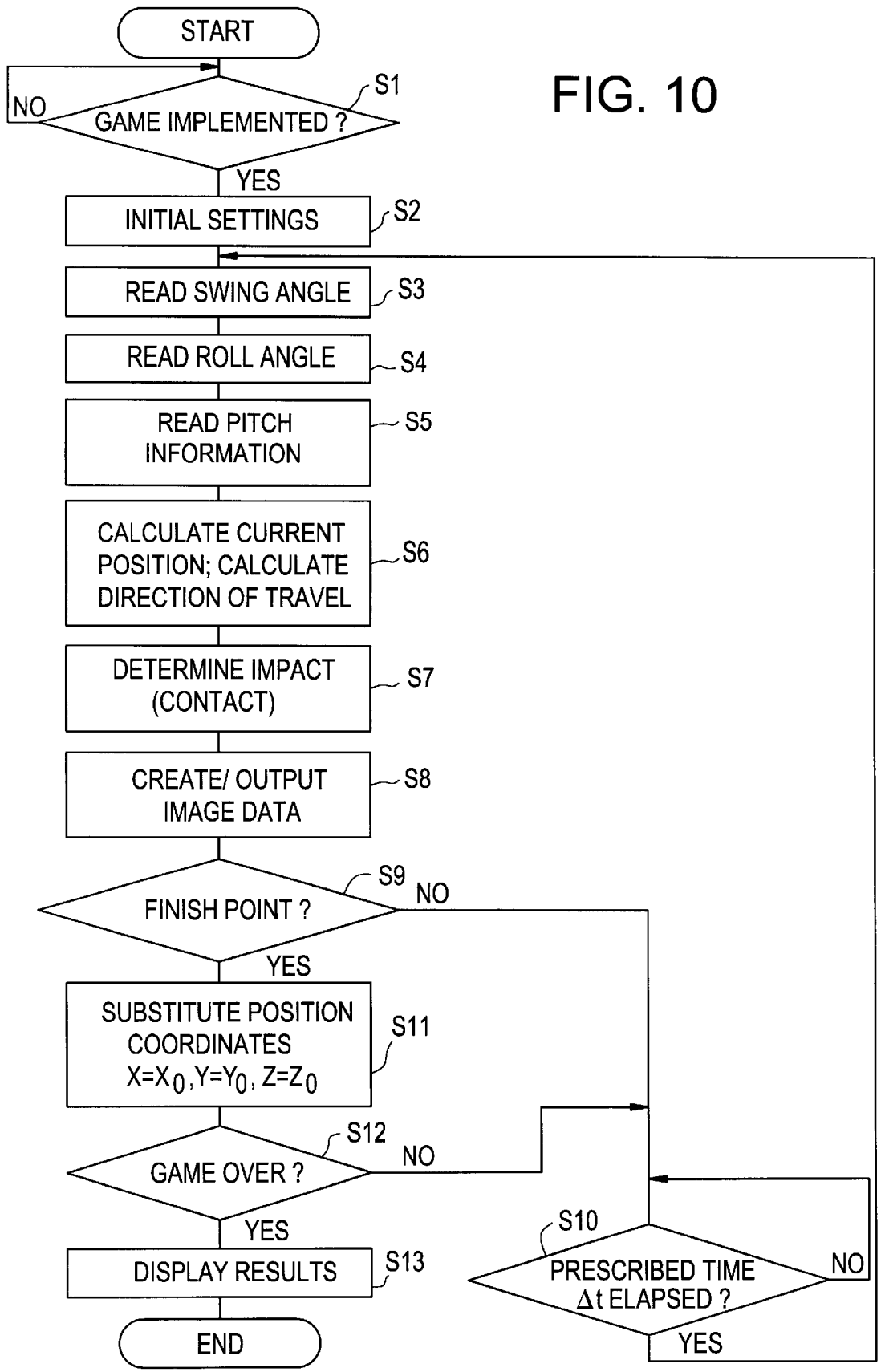
FIG. 10 is an approximate flowchart showing an example of data processing by a CPU.

Next, an outline of all the processing conducted by the CPU 101 is given with reference to FIG. 10.

When the game device is started up (step S1), initialisation processing is carried out (step S2). This initialisation processing involves the steps of setting the initial co-ordinates (X, Y, Z) in a virtual three-dimensional space for the character representing the player standing on the board to the co-ordinates (X0, Y0, Z0) of the departure point ST of a course for a skateboarding game constructed virtually in the aforementioned space. A command to release the electromagnetic brake is also contained in this process.

Figure 11:
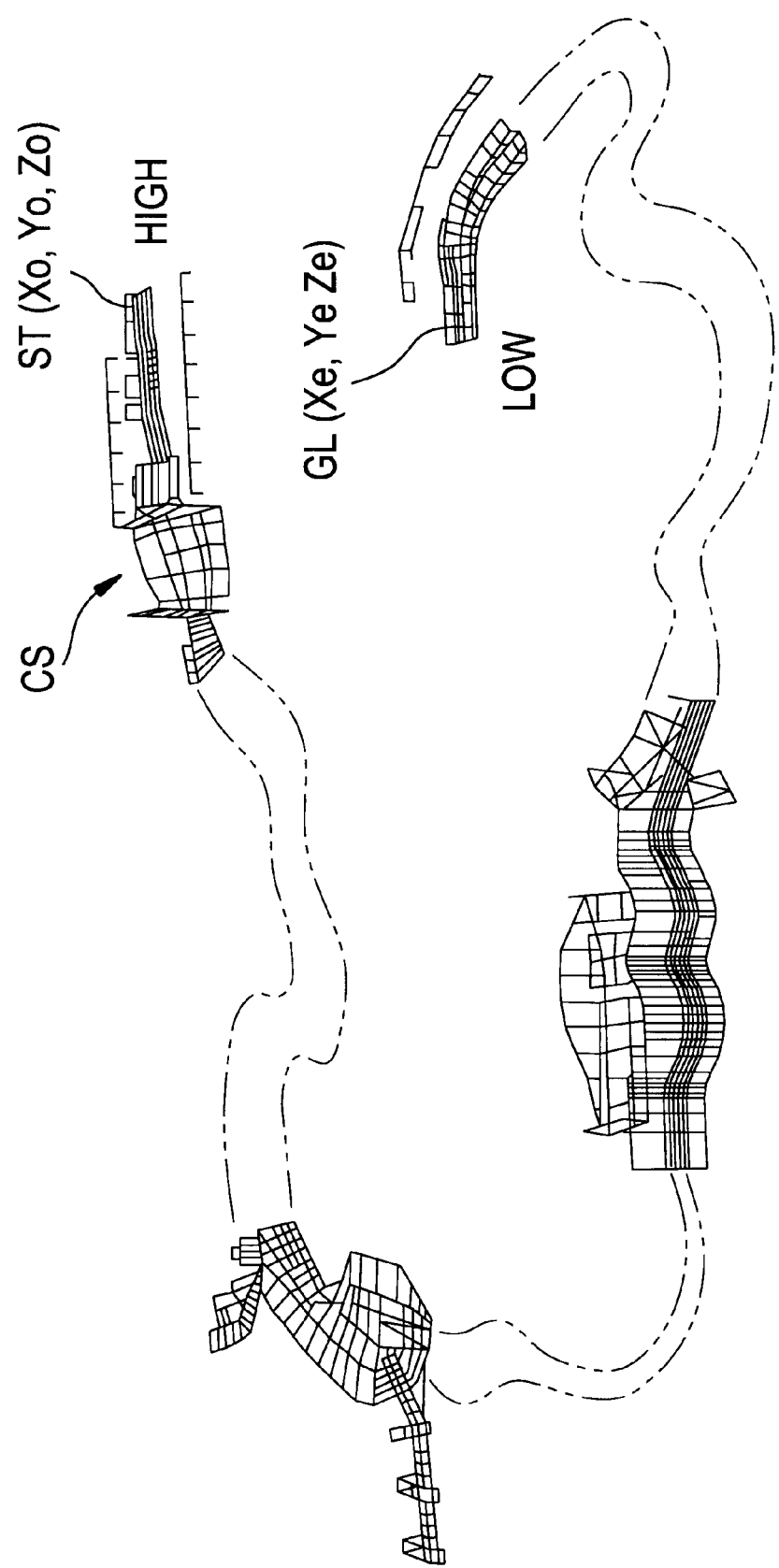
FIG. 11 is an approximate perspective view showing one example of a course.

As shown in FIG. 11, the course CS in the present mode of implementation has a winding shape with spiral or loop sections, and moreover, there is a height difference between the departure point ST and the finish point GL, the departure point being higher and the course as a whole sloping down gradually towards the finish point GL. Along the course, as well as variation in the course width and the properties of the ground surface, there are also to be found natural obstacles, such as trees, rocks, etc. and artificially created jumps, crossroads, and the like. There are also sections of the course CS where it slopes in a lateral direction. The course CS is formed by a set of polygons, and is stored in the form of ground surface shape data in the ROMs 109, 111.

When this initialisation processing is completed, the CPU 101 reads in operating information which is dependent on the movement of the player's body weight (steps S3–S5). In other words, swing angle information accompanying a swinging action is read in from the volume 44, roll angle information accompanying a rolling action is read in from the volume 62, and pitch movement on and off signals accompanying a pitching action are read in from the photointerrupters 82, 84.

Next, the CPU 101 refers to the information read in, and it calculates the current direction of travel and the current position (X, Y, Z) of the player's character, using parameters simulating a travelling state (step S6). These parameters include: the gradient of the course (fixed value or variable value relating to current position), the gradient component of the acceleration due to gravity, depending on whether the path is sloping (fixed value or variable value relating to current position), the body weight of the player's character (fixed value, for example,) a coefficient of friction which changes with position, and the like. On the basis of these parameters, the current direction of travel and position are calculated according to the swing angle and roll angle. Furthermore, since it is a game, characteristics particular to the game can be introduced in the aforementioned parameters and angle information.

Next, the CPU 101 conducts 'impact judgement processing', involving judgement of contact between the character and the ground surface, and judgment of impacts with obstacles, and the like, for the purpose of the image processing described below (step S7). When the character is in a half-ball-shaped section of the course, the contact between an imaginary lid covering this half-ball-shaped section and the head, or the like, of the character may be judged, this contact judgement processing being carried out in order to make the character perform airborne 180° turns, etc. which are a special feature of skateboarding.

When this series of impact judgement processes is completed, processing is implemented for drawing shape data (polygon data) incorporating the character behaviour processing, which corresponds to the viewpoint selected by the view change switch (step S8).

Specifically, the CPU 101 carries out drawing processes corresponding to the pitch information, current direction of travel and position, impact judgement results, and the like. The character and background, etc. corresponding to the direction of travel and position are prepared and image data for the character and background corresponding to actions, such as jumping manoeuvres (when, for example, in relation to a pitching action, it is confirmed that the board has been pitched forwards and backwards one time each), or airborne 180° turns (depending on impact judgement results), which are a characteristic feature of skateboarding. The CPU 101 then creates a transparent conversion matrix for transparent conversion of the three-dimensional shape data to a field of view co-ordinates system, and this matrix and the shape data are transferred to the geometrizer 110 via the RAM 103.

Figure 12:
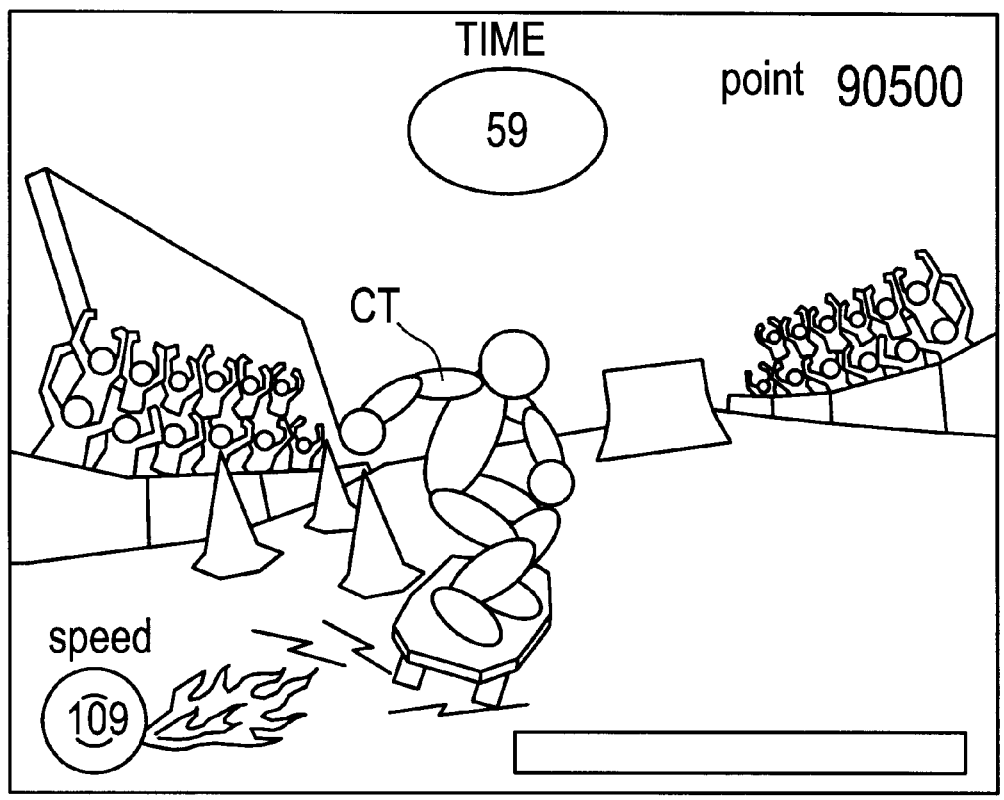
FIG. 12 is a diagram showing one example of a display image.

Thereby, an image as shown in FIG. 12, for example, is displayed on the TV monitor 92. In FIG. 12, CT is a character representing a player travelling down a slope.

Although not shown in the diagram, when the view change switch is selected and operated, the viewpoint for the displayed image switches accordingly.

When the display processing for this single frame is completed, the CPU 101 judges whether or not the current position of the character is at the predetermined finish point GL (Step S9). If the judgement is NO, then this identifies that the player's character is still travelling along the course, and the sequence waits for a prescribed time period Δt until the next frame (step S10). When the processing time for the next frame arises, the sequence returns to step S3 and the series of display processing steps described above is repeated.

On the other hand, if the judgement is "YES" at step S9, then the player's character has reached the finish point GL, and therefore processing relating to step S11 is implemented. Specifically, the current position (X, Y, Z) of the player's character is substituted with the departure point (x0, Y0, Z0). By this means, the player is directly able to follow the course CS again from the start, without performing any special operations. The player can follow the same course CS continuously in this manner indefinitely until the next step S12 determines that the game has ended. Furthermore, if necessary, a step for judging whether or not the game has ended can be inserted between step S9 and step S10.

When it is determined at step S12 that the game has ended, the game results up to that point are collated and displayed (step S13).

According to the game of the present mode of implementation as described above, since the supporting mechanism for the board 14B is capable of three oscillatory movements, namely, swing, roll and pitch, the simulated operation is given increased depth compared to game devices and methods where a swinging oscillatory movement only is provided, and therefore realism is improved and the player's interest in the game is raised. Furthermore, since pitching movements are reflected in the image processing, an improved sense of authenticity is obtained when simulating jumps, or the like, on the image display, and from this point of view, realism is improved markedly. Moreover, since the axis of rotation used in swinging movements is located beneath the board 14B, the operation of determining direction is made distinctly more realistic than in cases where this axis is set in front of the board, as in conventional devices. Also, by adding a roll action, it is possible to compute the sensation of travelling round a winding or loop-shaped course such that it matches the real feeling very closely, thereby improving the appeal of the game whilst also expanding the scope of actions that can be depicted by the character.

The board section 14 described above has a very compact and efficient structure, with the mechanisms performing three different actions being superposed in three layers, and each mechanism partially sharing supporting members, etc. Therefore, it is particularly suitable to a game device for a skateboarding game, and makes it possible to provide a smaller and less expensive game device.

When the character has reached the finish point of the course, the current position of the character is compulsorily returned to the departure point. Accordingly, the player is able to travel down the slope under his or her own weight again, without making any conscious action. Since a virtual endless course which is repeated continuously is set in this manner, a player can play a skateboarding game as much as he or she wants, provided that the player does not stop the game him or herself, or that there are no other factors, such as time-out, or the like, and therefore it is possible to provide a game device of excellent playability. By setting a loop-shaped circular course, it is possible to reduce the amount of shape data required to construct the course, compared to cases where a single long course is set, thereby providing a secondary advantage in that only a relatively small memory capacity is required.

The mode of implementation described here relates to a game device for playing a skateboarding game, but the present invention is not necessarily limited to this, and may also be applied suitably to snowboarding or skiing games, or the like.

As described above, in a supporting mechanism for a platform on which a player stands with both feet, the input device according to the present invention comprises a supporting mechanism which supports the platform such that it can oscillate, the central axes of this oscillation being located on the under side of, or below, the platform, and sensors which detect pitch information when the platform is pitched in a forward or backward direction by means of the player shifting his or her body weight on the platform, and supply this information to a game machine. The game device according to the present invention comprises, in the input device, a platform on which the player stands with both feet, a supporting mechanism which supports this platform such that it can oscillate, and pitch movement sensors which detect pitch movement information when the platform is pitched by means of the player shifting his or her body weight on the platform, and the game machine is also provided with movement control means for controlling the movement of a character in a virtual three-dimensional space on the basis of pitch movement information detected by the pitch sensors.

By means of this device and method, it is possible to make the swinging action on the board a rotational movement which is as close as possible to a real swinging movement, in contrast to conventional devices comprising skis or snowboards, etc., where the axis of rotation of the swing is positioned in front of the board. Furthermore, the sensation for the player can be improved and the scope of the display can be broadened by incorporating pitching operations, thereby improving realism and raising the player' interest in the game and the sense of authenticity markedly compared to conventional game devices.

Futhermore, the data processing device and data processing method according to the present invention determine whether the character has reached the finish point. When it is determined that the character has reached this finish point, then the co-ordinates for the character in the virtual three-dimensional space are substituted compulsorily with the positional co-ordinates of the departure point. By this means, the player can play a game which travels round a course continuously, for a long period of time, without noticing or having to perform complex operations, and therefore the added value of the game device is increased.

What is claimed is:

1. A data processing device for processing data for a simulation, wherein a character moves along a course set in a virtual three-dimensional space leading from a high-departure point to a low arrival point, comprising:

judging means for judging whether said character has reached said low arrival point; and co-ordinate substituting means for substituting co-ordinates for the character in said virtual three-dimensional space with co-ordinates of said high departure point, when said judging means judges that said character has reached said low arrival point.

2. The data processing device according to claim 1, wherein said course comprises a winding or spiral section in at least a portion thereof.

3. The data processing device according to claim 2, wherein movement control means are provided for controlling the movement of said character by considering an acceleration due to gravity depending on a gradient of said course, and the operational information from the player relating to the movement of the character.

4. A data processing method for processing data for a simulation, wherein a character moves along a course set in a virtual three-dimensional space leading from a high departure point to a low arrival point, comprising the steps of:

judging whether said character has reached said low arrival point; and substituting co-ordinates for the character in said virtual three-dimensional space with co-ordinates of said high departure point, when said judging step judges that said character has reached said low arrival point.

5. The method of claim 4 further including the step of:

initializing co-ordinates of the character at the high departure point in the virtual three-dimensional space.

6. The method of claim 4 further including the step of:

receiving operating information dependent on movement of body weight of a player.

7. The method of claim 6, wherein operating information includes at least one of:

swing angle information if the movement includes a swinging motion;

roll angle information if the movement includes a rolling action; and pitch information if the movement includes a pitching action.

8. The method of claim 7 further including the step of:

determining coordinates and direction of movement of the character based on the operating information, wherein the operating information includes at least one of: (i) gradient of a course; (ii) gradient component of acceleration due to gravity; (iii) body weight of the player; and (iv) coefficient of friction.

9. The method of claim 4, further including the steps of:

judging contact between the character and a ground surface; and judging impact with obstacles.

10. The method of claim 9, wherein the judging contact step further includes the step:

simulating airborne turns for the character.

11. The method of claim 4, further including the step of:

creating an output image for the player that includes the character and a background, wherein the background corresponds to actions of the character.

12. The method of claim 11, wherein the output image is based on information that includes at least one of: (i) a pitch information; (ii) a current direction of movement and a position of the character; and (iii) impact judgment results.

13. The method of claim 11, wherein the creating step further includes: creating a matrix of shape data that includes information of the character and the background.

14. The method of claim 4, further including the step of:

providing a player with oscillatory movements of the character that includes at least one movement of a pitch, roll and swing.

15. A computer-readable information storage medium encoded with instructions for directing a processor to:

generate information that causes a player to receive oscillatory movements of at least one of a pitch, a roll and a swing movement that corresponds to movement of a character;

judge whether the character has reached an arrival point; and substitute co-ordinates for the character in said virtual three-dimensional space with co-ordinates of said departure point, when said judging determines if the character has reached the arrival point.

16. The medium of claim 15 further causing the processor to:

initialize co-ordinates of the character at the departure point in the virtual three-dimensional space.

17. The medium of claim 15 further causing the processor to:

receive operating information dependent on movement of body weight of the player.

18. The medium of claim 17, wherein the operating information includes at least one of:

swing angle information if the movement includes a swinging motion;

roll angle information if the movement includes a rolling action; and pitch information if the movement includes a pitching action.

19. The medium of claim 15 further causing the processor to:

determine current coordinates and current direction of movement of the character based on the operating information, wherein the operating information includes at least one of: (i) gradient of a course; (ii) gradient component of acceleration due to gravity; (iii) body weight of the player; and (iv) coefficient of friction.

20. The medium of claim 15 further causing the processor to:

judge contact between the character and a ground surface; and judging impact with obstacles.

21. The medium of claim 15 further causing the processor to:

create an output image for the player that includes the character and a background, wherein the background corresponds to actions of the character.

* * * * *